April 23, 1940. G. M. ARGABRITE ET AL 2,197,776
APPARATUS FOR DRYING LEATHER
Filed Sept. 3, 1938 3 Sheets-Sheet 2
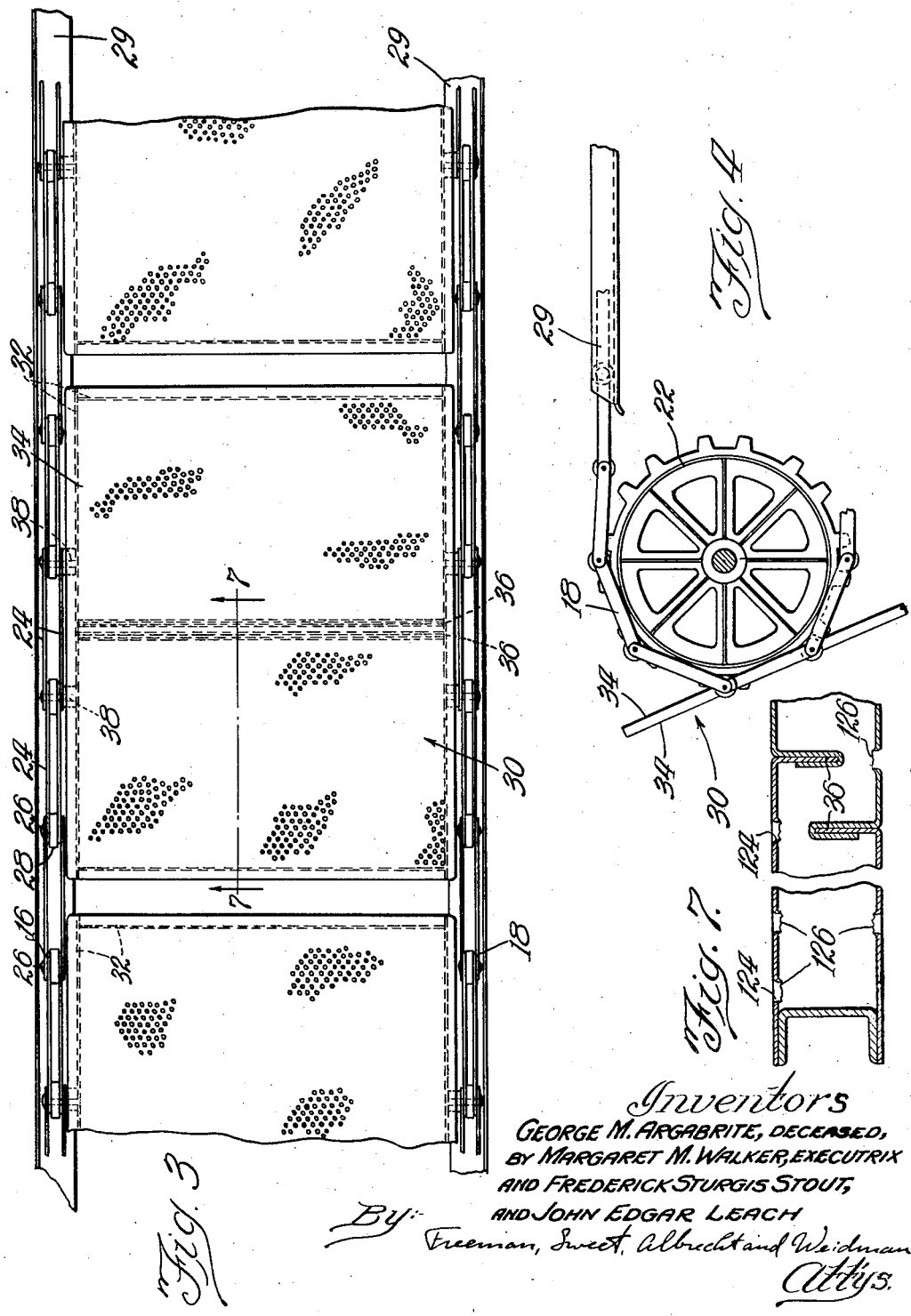

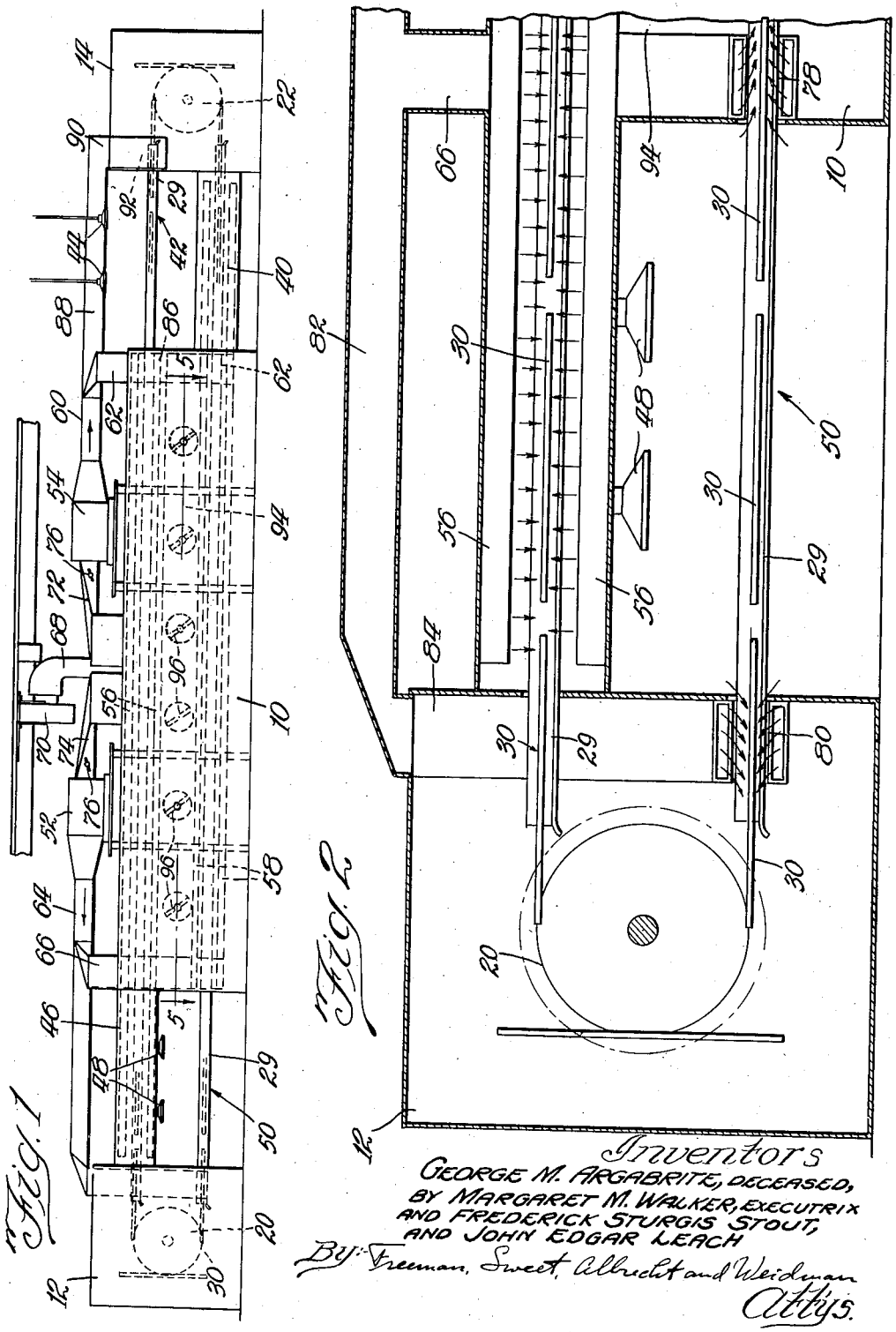

April 23, 1940.   G. M. ARGABRITE ET AL   2,197,776
APPARATUS FOR DRYING LEATHER
Filed Sept. 3, 1938   3 Sheets-Sheet 3
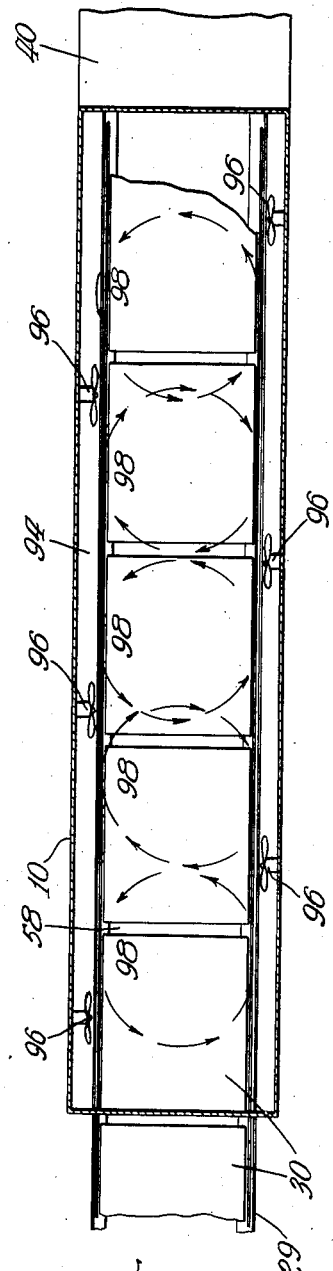
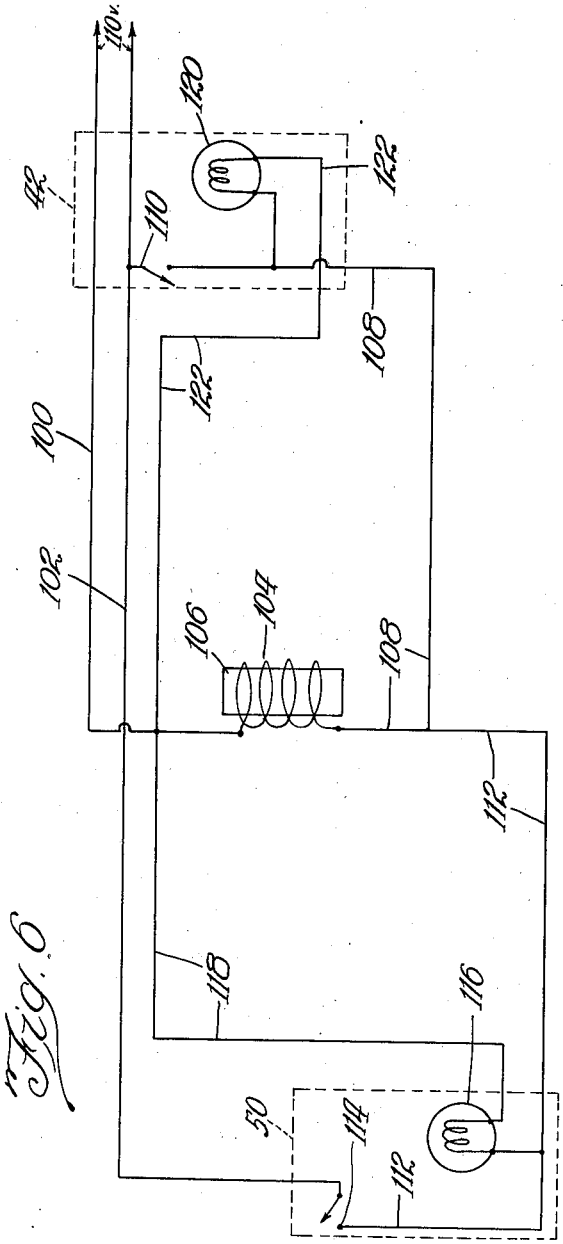
Inventors
GEORGE M. ARGABRITE, DECEASED,
BY MARGARET M. WALKER, EXECUTRIX
AND FREDERICK STURGIS STOUT,
AND JOHN EDGAR LEACH
By: Freeman, Sweet, Albrecht and Weidman
Attys.

Patented Apr. 23, 1940

2,197,776

UNITED STATES PATENT OFFICE 2,197,776

APPARATUS FOR DRYING LEATHER

George M. Argabrite, deceased, late of Cheyenne, Wyo., by Margaret M. Walker, executrix, formerly Margaret M. Argabrite, Cheyenne, Wyo., and Frederick Sturgis Stout and John Edgar Leach, Camden, N. J.; Margaret M. Walker assignor to Wesley H. Argabrite, Des Plaines, Ill.

Application September 3, 1938, Serial No. 228,422

6 Claims. (Cl. 34—12)

The invention relates to the processing of leather and includes among its objects and advantages an improvement in the removal of moisture from wet leather, of a type particularly advantageous where the requirements include a high degree of uniformity of moisture distribution in the finished product, or a high time rate of output with relation to the working personnel employed, or both.

In the accompanying drawings:

Figure 1 is a side elevation of a drier according to the invention;

Figure 2 is an enlarged central section in a vertical plane of the left hand portion of the drier of Figure 1;

Figure 3 is a plan view of a portion of one of the horizontal reaches of the conveyor;

Figure 4 is an enlarged side elevation of a sprocket wheel at one end of the conveyor;

Figure 5 is a partial section as on line 5—5 of Figure 1;

Figure 6 is a wiring diagram; and

Figure 7 is a detail section on line 7—7 of Figure 3.

Housing and conveyor

In the embodiment of apparatus according to the invention selected for illustration, the drier comprises a main chamber 10 and end chambers 12 and 14. The conveyor comprises a pair of duplicate spaced endless chains 16 and 18 driven by sprocket wheels 20 and 22 from any suitable source of power (not shown). Each sprocket chain is made up of overlapping links 24 united by pivots 26 on which pivots are supporting rollers 28 between the links. Between the sprocket wheels 20 and 22 are provided tracks 29 on which the rollers 28 ride, so that the reaches of the conveyor are substantially horizontal instead of assuming a catenary curve. On the chains is supported an unbroken series of frames 30. Each frame, as indicated in Figure 3, has a rigid peripheral structure 32 of structural iron and a pair of foraminated plates 34 in closely spaced parallel planes, one above and one below the peripheral structure 32. As illustrated, the frames are of quite large size, and accordingly the plates 34 are each made up in two sections with the edges of the sections crimped over each other as indicated in Figure 3 at 36 to unite the sections. Each side of each frame carries two spaced pivots 38 equally spaced from the transverse center line of the frame and separated by a distance equal to the distance between two adjacent pivots 26. These pivots 38 are entered inside the pivots 26 so that the frame 30 as a whole moves and turns with the links 24 between the pivots 26 on which the frame is mounted. It will be apparent that, as clearly indicated in Figures 1 and 2, each frame 30 will travel in a horizontal position from one sprocket wheel to the other and then rotate around the center of rotation of the sprocket wheel through the vertical positions illustrated in Figure 2 back into a new horizontal position in the opposite reach of the conveyor, but with the other side of the frame uppermost.

At each end of the apparatus a length of the conveyor is exposed to permit workmen to remove dried kips or hides from the frames and replace them with wet kips or hides to be dried. In Figure 1 is illustrated a housing section 40 at the right hand end, which section is of reduced size and establishes communication between the housings 10 and 14 around the lower reach of the conveyor. But the corresponding portion 42 of the upper reach of the conveyor below the lights 44 which are provided to illuminate the working space, is exposed. Similarly, at the left hand end there is provided a reduced housing section 46 surrounding the upper reach of the conveyor and establishing communication between the chambers 10 and 12. The lights 48 are positioned below the housing section 46 to illuminate the exposed conveyor portion at 50.

Drying

To dry the leather as it passes through the housings 2 air heating and conditioning units 52 and 54 are provided from which warm air may be delivered. Above and below the upper reach of the conveyor throughout the extent of the housings 10 and 46, lie horizontal air ducts 56. The surfaces of these air ducts adjacent the conveyor are perforated so that warm air for drying flows out of them and into contact with the leather on the frames. Similar air ducts 58 are provided above and below the lower reach of the conveyor throughout the housings 10 and 40. The conditioning unit 54 delivers conditioned air through a horizontal duct 60 to a riser 62 which communicates with all four of the horizontal ducts 56 and 58, and the conditioning unit 52 delivers conditioned air to the horizontal duct 64 which in turn communicates with the riser 66, and the riser 66 also communicates with all four of the horizontal ducts 56 and 58. This is the main air supply for drying purposes.

The air thus discharged against the leather finds its way laterally to either side and rises along the sides of the chamber 10 and is withdrawn through the duct 68. Suitable means for maintaining the circulation is illustrated in the form of the exhaust fan 70.

Where the conditions of drying are such that the spent air is too heavily charged with moisture to be worth recirculating, all the air may be discharged at the outlet 68. However, under conditions where this air is still of some use, part or all of it may be recirculated, as by means of the return duct 72 leading from the discharge duct 68 to the air conditioning unit 54, and the return duct 74 leading from the discharge duct 68 to the air conditioning unit 52. In these return ducts dampers 76 are provided to control the amount of recirculation or to prevent any recirculation at all.

To avoid the discharge of heated air at the ends of the exposed conveyor portions 42 and 50, there is provided a small air box 78 indicated in Figure 2 adjacent the right hand end of the conveyor portion 50 and just inside the housing 10. The air discharged from the box 78 is directed laterally to the right so that a gentle suction is developed around the opening in the wall of the chamber 10 where the conveyor enters the chamber. This establishes a gentle suction around the opening which need not necessarily be sufficient to draw in any appreciable amount of outside air, but prevents the escape of any of the warm air in the chamber, which would not only represent a loss of drying power but inconvenience the workmen as well. The box 78 may secure its air supply from the riser 66. A similar box 80 at the left hand end of the exposed portion 50 may secure its air through an extension 82 of the duct 64 and a riser 84.

Similarly, as clearly indicated in Figure 1, a box 86 at the left end of the exposed portion 42 receives its air supply from the riser 62, and the extension 88, and riser 90 deliver air to the box 92 at the right hand end of the exposed portion 42.

Under many load conditions the movement of the air inside the large chamber 10, produced solely by the action of the inlet and outlet ducts, tends to be somewhat irregular and to exert a variable drying action on different portions of the conveyor. Within the horizontal clearance space indicated at 94 in Figures 1, 2, and 5, there is provided a series of small fans 96. As clearly indicated in Figure 5 these fans are staggered alternately near opposite side walls of the housing 10 and they set up a series of horizontal vortices 98 by means of which the rising air is thoroughly mixed and kept uniform in temperature and moisture content.

Operation

In one successful installation the speed of the conveyor is between two and three feet per minute and it takes substantially half an hour for a particular frame to complete the entire circuit. Each frame enters the exposed portion 42 with the hide on top completely dry and ready for removal and the hide on the bottom substantially half dry. At this point workmen standing beside the conveyor unfasten the hide from its supporting plate 34 and remove it and replace it with a new wet hide to be dried, in which condition the frame enters the main drier section 10. About fifteen minutes later this same frame will have rounded the sprocket 20 and will enter the exposed section 50 with the wet hide attached at the other end of the conveyor now on the underside of the frame and half dry, and the half dry hide that was on the underside of the frame at the other end of the conveyor on top and completely dried. Accordingly, the task of removing the dried hide on top and replacing it with a wet one as the frame passes through the exposed portion 50 is identical with the task performed by the workmen at 42. In the successful installation referred to, it is customary to have two workmen working at 42 and two others at 50 and these four men have substantially nothing to do but take off finished hides and put on wet ones, by means of the edge toggles common in the art, which enter openings in the foraminated plate 34 and pin the edge of the hide to the plate 34 around the periphery of the hide. It will be obvious that the frame may carry a single hide or piece of leather on each side, or a plurality of pieces, depending on the relative sizes of the pieces of leather and the frame.

The speed stated is such as to keep the workmen substantially continuously employed in removing and replacing the hides. However, in case of any delay for any reason it is preferable to maintain full load on the drier and uniformity in the load throughout the drier by having a new wet hide on every entering frame, rather than allowing an occasional frame to go through empty. In Figure 6 is indicated the arrangement of wiring necessary to enable the workmen at 42 or the workmen at 50 to stop the movement of the conveyor momentarily in case they are not quite able to keep up with the work. The power lines 100 and 102 are supplied with electrical energy from a suitable source and the line 100 extends to the winding 104 of a solenoid 106 arranged to stop the motor which drives the sprocket wheels 20 and 22. From the other terminal of the winding 104 a conductor 108 extends to the control switch 110 by means of which the workmen at 42 can stop the motor. And another conductor 112 extends to the control switch 115 by means of which the workman at 50 can stop the motor. Signal light 116 visible to the workmen at 50 is shunted across the winding 104 by means of a conductor 118, and signal light 120 is similarly shunted across the same winding 104 by means of the conductor 122. Thus when the workmen at either position find it necessary to interrupt the movement of the conveyor momentarily to catch up, both signal lights 116 and 120 will be lit so that the workmen at the other end of the conveyor will know that the interruption is caused by their team mates and not by any failure of power or shut down of the machine.

It will be obvious that the speed of the conveyor depends on the type of leather that the workmen are putting on, and on the number of pieces they put on each support. In operation, the speed is adjusted to keep the workmen comfortably busy changing leather, and then the hot air supply is adjusted to secure the desired dryness under those conditions of speed and load.

Referring now to Figure 7, the individual apertures in the plates 34 are indicated at 124, and it will be noted that around each aperture there remains a burr 126. It has been customary in the past to mount hides for drying on single sheets of metal. In such cases it is necessary to smooth the edges of such holes as 124 so that no sharp projections are left anywhere to scratch the leather or the workmen's fingers or both. The machining operations necessary to smooth the edges of such a large number of holes, represent a cost in excess of the cost of the metal for the plate, but a simple punching operation will form holes such as illustrated in Figure 7, with one side of the plate smooth and entirely suitable for immediate use. By using two spaced plates as shown, we not only obtain a substantial air space between the leather on opposite sides, which assists in making the drying action uniform on the different parts of each piece of leather, but we eliminate the heavy expense of smoothing and polishing the edges of the holes. And because of the large size of the supports and the additional structural strength resulting from spacing the plates apart, the total weight of metal in the finished support is not seriously increased. The final result is a support that has three advantages over the single plate; first, it is cheaper to produce; second, it is much more rigid but still not objectionably heavy; and third, it has the inside air space that equalizes the drying action.

Without further elaboration the foregoing will so fully explain the invention that others may, by applying knowledge current at the time of application, readily adapt the same for use under various conditions of service.

We claim:

1. Leather drying equipment comprising: a drying chamber; an endless conveyor comprising a series of connected links lying in a path, the greater portion of which is inside said chamber, but passing outside said chamber at two exposed portions; said exposed portions being remote from each other and separated by substantially equal distances of enclosed path; means for delivering heated air to said chamber; means for discharging spent air from said chamber; air jet means for sealing the points of entry and exit of said conveyor against egress of air; conveyor supports guiding and actuating said conveyor through horizontal reaches in one of which said links are one side up and in the other of which said links are the other side up; individual article supports on certain of said links and invertible with said links; one of said exposed portions being positioned in one of said reaches and one in the other of said reaches; said article supports being flat and foraminated and each adapted to receive and support two pieces of leather in slightly spaced parallel planes; and means for actuating said conveyor.

2. Leather drying equipment comprising: a drying chamber; an endless conveyor comprising a series of connected links lying in a path, the greater portion of which is inside said chamber, but passing outside said chamber at two exposed portions; said exposed portions being remote from each other and separated by substantially equal distances of enclosed path; means for delivering heated air to said chamber; means for discharging spent air from said chamber; conveyor supports guiding and actuating said conveyor through horizontal reaches in one of which said links are one side up and in the other of which said links are the other side up; individual article supports on certain of said links and invertible with said links; one of said exposed portions being positioned in one of said reaches and one in the other of said reaches; said article supports being flat and foraminated and each adapted to receive and support two pieces of leather in slightly spaced parallel planes; and means for actuating said conveyor.

3. Leather drying equipment comprising: a drying chamber; an endless conveyor comprising a series of connected links lying in a path, the greater portion of which is inside said chamber, but passing outside said chamber at two exposed portions; said exposed portions being remote from each other and separated by substantially equal distances of enclosed path; conveyor supports guiding and actuating said conveyor through horizontal reaches in one of which said links are one side up and in the other of which said links are the other side up; individual article supports on certain of said links and invertible with said links; one of said exposed portions being positioned in one of said reaches and one in the other of said reaches; said article supports being flat and each adapted to receive and support two pieces of leather one on each side; means for actuating said conveyor; and means for supplying a gaseous drying medium to said chamber.

4. Leather drying equipment comprising: a drying chamber; an endless conveyor the greater portion of which is inside said chamber, but passing outside said chamber at two exposed portions; said exposed portions being remote from each other and separated by substantially equal distances of enclosed path; individual article supports on said conveyor; one of said exposed portions being positioned in one of said reaches and one in the other of said reaches; said article supports being flat and each adapted to receive and support two pieces of leather one on each side; and means for actuating said conveyor and guiding it in a path so that different faces of said supports are uppermost in said different exposed portions.

5. Leather drying equipment comprising: a pair of foraminated supporting plates; each plate having foraminations formed by a simple punching operation; each opening being surrounded by a burr on one side of said plate, but having a smooth rounded edge on the other side of said plate; said plates being arranged in parallelism with the burr sides facing toward each other and the smooth sides accessible for mounting leather.

6. Leather drying equipment comprising: a pair of foraminated supporting plates; each plate having foraminations formed by a simple punching operation; each opening being surrounded by a burr on one side of said plate, but having a smooth rounded edge on the other side of said plate; said plates being arranged in parallelism with the burr sides facing toward each other and the smooth sides accessible for mounting leather; and a frame supporting said plates in spaced apart relationship to define an air space between them.

FREDERICK STURGIS STOUT.
JOHN EDGAR LEACH.
MARGARET M. WALKER,
*Margaret M. Walker, formerly Margaret M. Argabrite, Widow and Executrix of the Estate of George M. Argabrite, Deceased.*